(12) United States Patent
Faccia

(10) Patent No.: US 6,983,902 B2
(45) Date of Patent: Jan. 10, 2006

(54) ZOOTECHNICAL USE SHREDDING AND MIXING APPARATUS FOR A TRUCK

(76) Inventor: Tiziano Faccia, Via Terrassa, 1 - 35026 Conselve (IT)

(*) Notice: Subject to any disclaimer, the term of this patent is extended or adjusted under 35 U.S.C. 154(b) by 0 days.

(21) Appl. No.: 10/490,269

(22) PCT Filed: Sep. 25, 2002

(86) PCT No.: PCT/IB02/03988

§ 371 (c)(1),
(2), (4) Date: Mar. 22, 2004

(87) PCT Pub. No.: WO03/030626

PCT Pub. Date: Apr. 17, 2003

(65) Prior Publication Data

US 2004/0238664 A1   Dec. 2, 2004

(30) Foreign Application Priority Data

Sep. 28, 2001  (IT) .......................... PD2001A0229

(51) Int. Cl.
  *B01F 7/24*  (2006.01)
(52) U.S. Cl. .............. 241/101.761; 366/297; 366/299; 366/314; 366/323; 366/603; 241/101.8; 241/260.1
(58) Field of Classification Search ........ 241/101.761, 241/101.8, 260.1; 366/297, 299, 314, 323, 366/603
See application file for complete search history.

(56) References Cited

U.S. PATENT DOCUMENTS

| 3,899,159 | A | * | 8/1975 | Nauta ....................... 366/169.1 |
|---|---|---|---|---|
| 3,948,451 | A | * | 4/1976 | Pecis .......................... 241/154 |
| 3,995,836 | A | * | 12/1976 | Carter et al. ................. 366/192 |
| 4,612,853 | A | * | 9/1986 | Kostiainen et al. ........... 99/461 |
| 5,240,321 | A | * | 8/1993 | Miller .......................... 366/45 |
| 5,294,064 | A | * | 3/1994 | Faccia ................... 241/101.74 |
| 5,379,940 | A | * | 1/1995 | Knight et al. ................ 239/675 |
| 5,429,436 | A | | 7/1995 | Stone |
| 5,553,937 | A | * | 9/1996 | Faccia ......................... 366/302 |
| 5,553,938 | A | * | 9/1996 | Faccia ......................... 366/302 |
| 5,803,375 | A | | 9/1998 | Hartwig |
| 6,409,377 | B1 | * | 6/2002 | Van Der Plas .............. 366/297 |
| 6,663,275 | B2 | * | 12/2003 | Knight ........................ 366/141 |

FOREIGN PATENT DOCUMENTS

| EP | 0 527 428 A | 2/1993 |
|---|---|---|
| EP | 0 704 153 A | 4/1996 |

* cited by examiner

*Primary Examiner*—Derris H. Banks
*Assistant Examiner*—Jason Y. Pahng
(74) *Attorney, Agent, or Firm*—Albert Josif; Daniel O'Bvrne

(57) ABSTRACT

A truck for shredding and mixing products for zootechnical use, of the type that comprises, on a chassis (11) with wheels (12) that is self-propelled or towed, a container (13) that is substantially shaped like an inverted frustum, is open in an upper region and contains shredding and mixing means (14) which comprise at least two adjacent rotating main screw feeders (15, 16), each having an external profile (17) that lies on a substantially conical imaginary surface and at which shredding cutters are mounted. Contrast cutters (20) substantially shaped like circular sectors are hinged to the internal wall of the container (13) by means of their respective vertices in a vertical arrangement in substantially radial positions and can be inserted and removed through appropriately provided slots. Auxiliary screw feeders (18, 19), suitable to avoid the formation of stagnation regions, are arranged between the main screw feeders (15, 16), in the regions adjacent to the walls of the container (13).

10 Claims, 2 Drawing Sheets

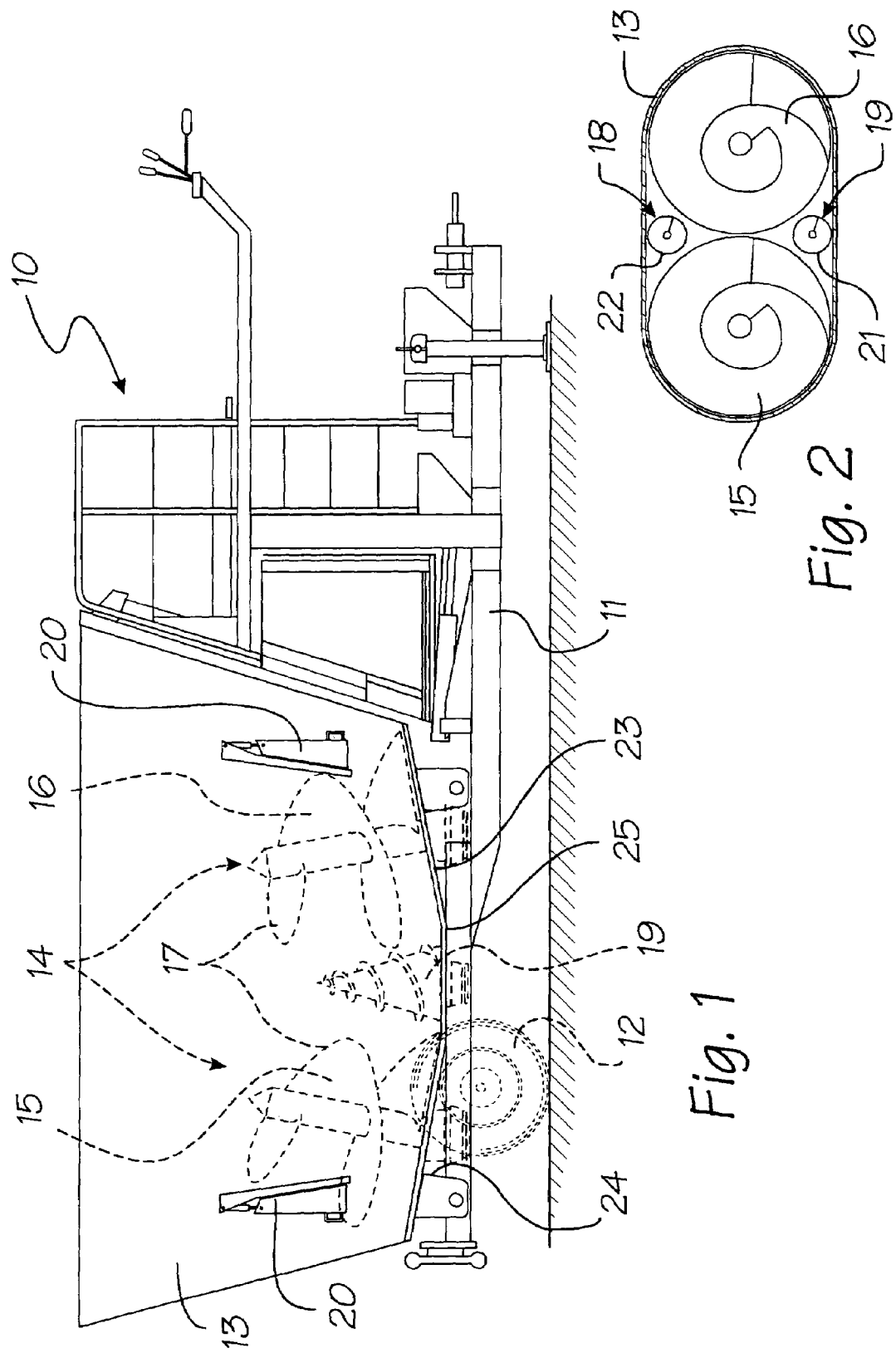

ZOOTECHNICAL USE SHREDDING AND MIXING APPARATUS FOR A TRUCK

The present invention relates to a truck for shredding and mixing products for zootechnical use.

BACKGROUND OF THE INVENTION

In the zootechnical sector, it is known to prepare fodder, particularly for cattle, by using shredding and mixing trucks provided with a vertical screw feeder and substantially constituted by an inverted frustum-shaped container arranged on a wheeled chassis inside which a rotating screw feeder is arranged vertically, the profile of its helix lying on a substantially conical imaginary surface.

Cutters are fixed peripherally to the screw feeder and are suitable to shred the product being mixed, which is appropriately loaded from above and is constituted largely by fibrous material such as hay and straw with the addition of protein supplements, ensilaged products, flours, et cetera.

To contrast the rotary motion of the product being processed entrained by the rotating screw feeder, in the lower part of the container there are contrast cutters, which are arranged vertically in substantially radial positions and can be inserted and removed through slots provided in the wall of the container.

The above described trucks, while being used successfully, have drawbacks related most of all to the level and to the time required in shredding and mixing operations.

Moreover, recirculation and mixing on the substantially vertical plane is still not optimum.

SUMMARY OF THE INVENTION

The aim of the present invention is to provide a truck for shredding and mixing products for zootechnical use in which the drawbacks noted above in known types of truck are eliminated, particularly improving the times and levels of mixing and shredding.

Within this aim, a consequent primary object is to provide a truck in which the mechanical work of its components is optimized with reference to the stresses to which they are subjected, to the consequent wear, and to the quality of the fodder obtained.

Another important object is to provide a truck that has reduced bulk problems related to the screw feeders in relation to the achieved productivity.

Another object of the present invention is to provide a truck that can be manufactured with known technologies and systems.

This aim and these and other objects that will become better apparent hereinafter are achieved by a truck for shredding and mixing products for zootechnical use, of the type that comprises, on a wheeled chassis that is self-propelled or towed, a container that is substantially shaped like an inverted frustum, is open in an upper region and contains shredding and mixing means which comprise at least two adjacent rotating main screw feeders, each one of said screw feeders having an external profile that lies on a substantially conical imaginary surface and at which shredding cutters are mounted, contrast cutters substantially shaped like circular sectors being hinged to the internal wall of said container by means of their respective vertices in a vertical arrangement in substantially radial positions and being insertable and removable through appropriately provided slots, said truck being characterized in that auxiliary screw feeders, suitable to avoid the formation of stagnation regions, are arranged between said main screw feeders, in the regions adjacent to the walls of said container.

BRIEF DESCRIPTION OF THE DRAWINGS

Further characteristics and advantages of the invention will become better apparent from the detailed description of an embodiment thereof and of a corresponding variation, illustrated only by way of non-limitative example in the accompanying drawings, wherein:

FIG. 1 is a schematic side view of a truck according to the invention in a first embodiment;

FIG. 2 is a schematic reduced-scale top view of the truck of FIG. 1;

DESCRIPTION OF THE PREFERRED EMBODIMENTS

Figure 3:
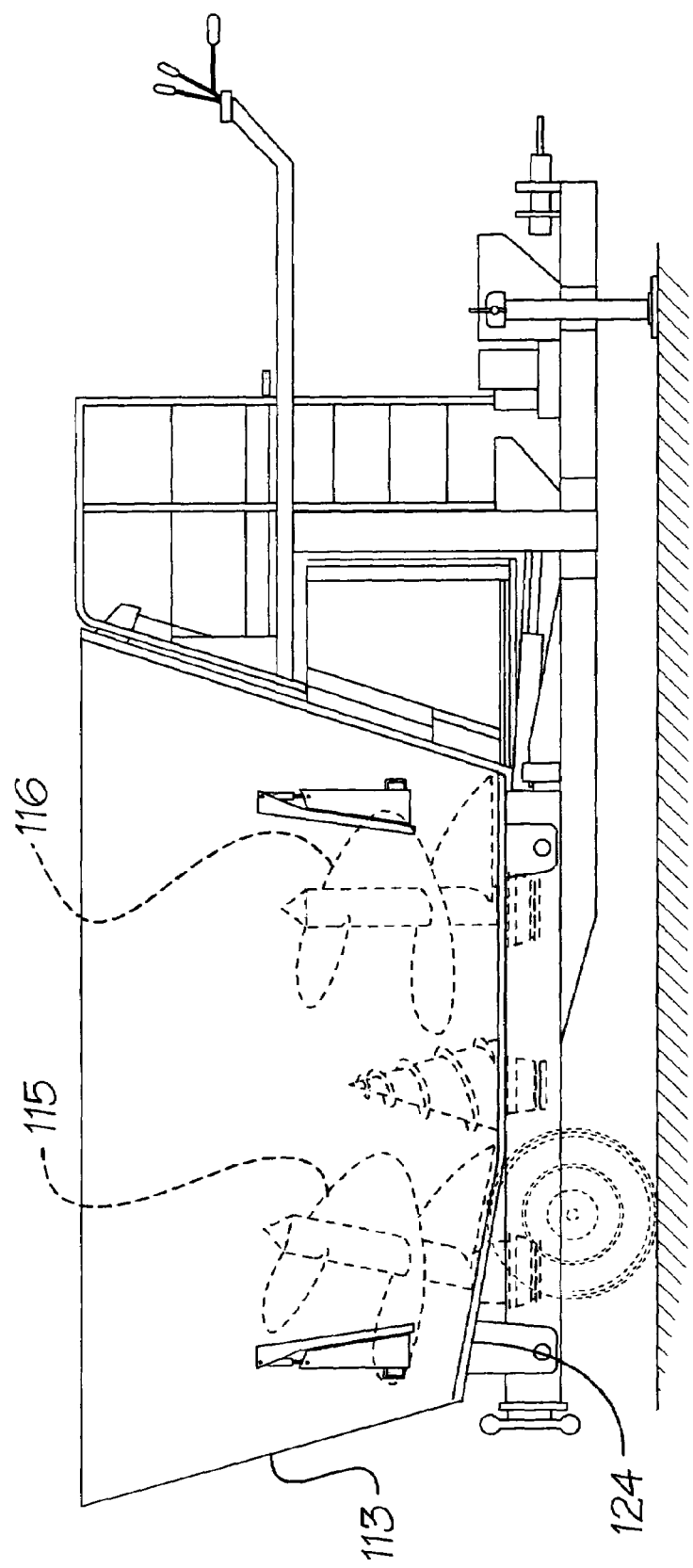
FIG. 3 is a schematic side view of the truck in a different embodiment.

With reference to FIG. 1, a truck for shredding and mixing products for zootechnical use according to the invention is generally designated by the reference numeral 10 in a first embodiment.

The truck 10 comprises, on a chassis 11 with wheels 12, which in this case is towed, a container 13 that is shaped approximately like an inverted frustum, is open in an upper region, and contains shredding and mixing means, generally designated by the reference numeral 14.

The shredding and mixing means 14 comprise two adjacent rotating main screw feeders, designated by the reference numerals 15 and 16, each of which has an external profile 17 that lies on an imaginary substantially conical surface at which shredding cutters, not shown, are fitted.

In the figure, the main screw feeders are shown identical, but they might also have different dimensions according to the specific requirements of use.

The main screw feeders 15 and 16 might also be arranged so as to intersect, in a projection view, portions of their profile and have an axis that is inclined with respect to the horizontal.

Contrast cutters 20, shaped substantially like a circular sector, are hinged to the wall of the container 13 by means of their respective vertices in a vertical arrangement on substantially radial positions and can be inserted and removed through appropriately provided slots.

According to the invention, auxiliary screw feeders 18 and 19 are arranged for example vertically between said main screw feeders 15 and 16, in the regions adjacent to the walls of the container 13, and are suitable to avoid the formation of stagnation regions.

The screw feeders 18 and 19 might of course also be arranged horizontally, for example with an angled motion transmission system.

Each screw feeder 18 or 19 comprises, in this case, a conical body with a spiral-shaped external band 21 or 22 of constant width.

As an alternative, a cylindrical body might be provided for the auxiliary screw feeders 18 and 19.

Moreover, the bottom of the container 13 is shaped so as to form two regions, namely a front region 23 and a rear region 24, which are inclined with respect to the central part 25, which is horizontal and on which the auxiliary screw feeders 18 and 19 are arranged.

The main screw feeders 15 and 16 are arranged on the regions 23 and 24 and are perpendicular thereto and therefore rotate on axes that are inclined with respect to the vertical and converge upward.

As shown in FIG. 3, only one of the main screw feeders 115 or 116 might be provided on an inclined region 124 of the bottom of the container 113 and be therefore inclined with respect to the vertical.

The inclined screw feeder may equally be the front one or the rear one, the choice being determined by convenience in use.

In practice it has been found that the intended aim and objects of the present invention have been achieved.

In particular, it is noted that in the truck according to the invention the drawbacks noted in known types of truck, with particular reference to the times and levels of mixing and shredding, are completely eliminated.

Moreover, the truck according to the invention allows high optimization of the mechanical work of the components that constitute it, especially with reference to the stresses to which it is subjected and to the consequent wear, and the quality of the resulting fodder.

The truck according to the invention further has, with respect to the obtained productivity, optimum dimensions as regards the screw feeders.

In practice, the materials employed, so long as they are compatible with the contingent use, as well as the dimensions, may be any according to requirements.

The disclosures in Italian Patent Application No. PD2001A000229, from which this application claims priority, are incorporated herein by reference.

What is claimed is:

1. Zootechnical use shredding and mixing apparatus for a truck comprising: a wheeled chassis that is self-propelled or towed, a container that is substantially shaped like an inverted frustum, said container being open in an upper region and containing shredding and mixing means which comprise at least two adjacent rotating main screw feeders, each one of said screw feeders having an external profile that lies on a substantially conical imaginary surface, contrast cutters substantially shaped like circular sectors being hinged to an inner wall of said container by means of respective vertices thereof in a vertical arrangement in substantially radial positions and being insertable and removable through slots, wherein auxiliary screw feeders, suitable to avoid the formation of stagnation regions, are arranged between said main screw feeders, in regions adjacent to walls of said container.

2. The zootechnical use shredding and mixing apparatus of claim 1, wherein at least one of said auxiliary screw feeders has a vertical axis.

3. The zootechnical use shredding and mixing apparatus of claim 1, wherein at least one of said auxiliary screw feeders has a horizontal axis.

4. The zootechnical use shredding and mixing apparatus of claim 1, wherein each one of said auxiliary screw feeders comprises a conical body provided externally with a band that has a constant width and a spiral shape.

5. The zootechnical use shredding and mixing apparatus of claim 1, wherein each one of said auxiliary screw feeders comprises a cylindrical body provided externally with a band that has a constant width and a spiral shape.

6. The zootechnical use shredding and mixing apparatus of claim 1, wherein said container has a bottom that is shaped so as to form at least one front or rear region that is inclined with respect to a horizontal central portion, a respective one of said main screw feeders being arranged on said at least one region at right angles thereto and rotating therefore on an axis that is inclined with respect to the vertical.

7. The zootechnical use shredding and mixing apparatus of claim 1, wherein said container has a bottom that is shaped so as to form two regions, a front region and a rear region, that are inclined with respect to a horizontal central portion and on which said auxiliary screw feeders are arranged, the main screw feeders being arranged on said regions at right angles thereto and rotating therefore on axes that are inclined with respect to the vertical and converge upward.

8. The zootechnical use shredding and mixing apparatus of claim 1, wherein said main screw feeders have different dimensions.

9. The zootechnical use shredding and mixing apparatus of claim 1, wherein said main screw feeders have an inclined axis.

10. The zootechnical use shredding and mixing apparatus of claim 1, wherein said main screw feeders are arranged so that the respective profiles mutually intersect.

* * * * *